(12) United States Patent
Yoshida et al.

(10) Patent No.: US 8,540,079 B2
(45) Date of Patent: Sep. 24, 2013

(54) SLUDGE FILTRATION APPARATUS AND FILTER ASSEMBLY THEREOF

(75) Inventors: Koji Yoshida, Miyazaki (JP); Mikimasa Yamaguchi, Yokosuka (JP)

(73) Assignee: Metawater Co., Ltd. (JP)

( * ) Notice: Subject to any disclaimer, the term of this patent is extended or adjusted under 35 U.S.C. 154(b) by 1145 days.

(21) Appl. No.: 11/875,941

(22) Filed: Oct. 21, 2007

(65) Prior Publication Data

US 2009/0101569 A1   Apr. 23, 2009

(51) Int. Cl.
*B01D 35/32* (2006.01)
*B01D 24/46* (2006.01)

(52) U.S. Cl.
USPC ............ 210/411; 210/410; 210/798; 210/797; 210/321.69; 210/321.87; 210/416.1

(58) Field of Classification Search
USPC .......................................... 210/411, 393, 462
See application file for complete search history.

(56) References Cited

U.S. PATENT DOCUMENTS 3,659,718 A * 5/1972 Brociner et al. ......... 210/333.01

FOREIGN PATENT DOCUMENTS

| JP | 63-13721 B2 | 3/1988 |
| JP | 2001-145899 A | 5/2001 |

* cited by examiner

*Primary Examiner* — Krishnan S Menon
*Assistant Examiner* — Allison M Gionta
(74) *Attorney, Agent, or Firm* — Rossi, Kimms & McDowell LLP

(57) ABSTRACT

A sludge filtration apparatus has a sludge tank configured to store sludge and at least one filter assembly. The filter assembly includes a filtration membrane for filtering the sludge and a pipe insertable in the filtration membrane to supply air to a secondary side of the filtration membrane for dislodging the sludge from the filtration membrane. The pipe has a plurality of holes for discharging gas, namely air, to an area in which the filtration membrane inclines downwardly with the secondary side thereof. The sludge filtration apparatus can prevent thickened sludge from remaining in an upper portion of the filter assembly.

13 Claims, 3 Drawing Sheets

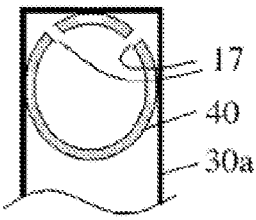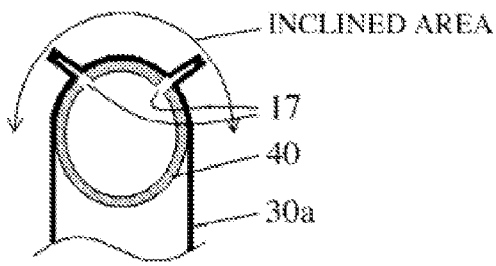
Fig. 9A  BEFORE FILTRATION
Fig. 9B  AFTER FILTRATION
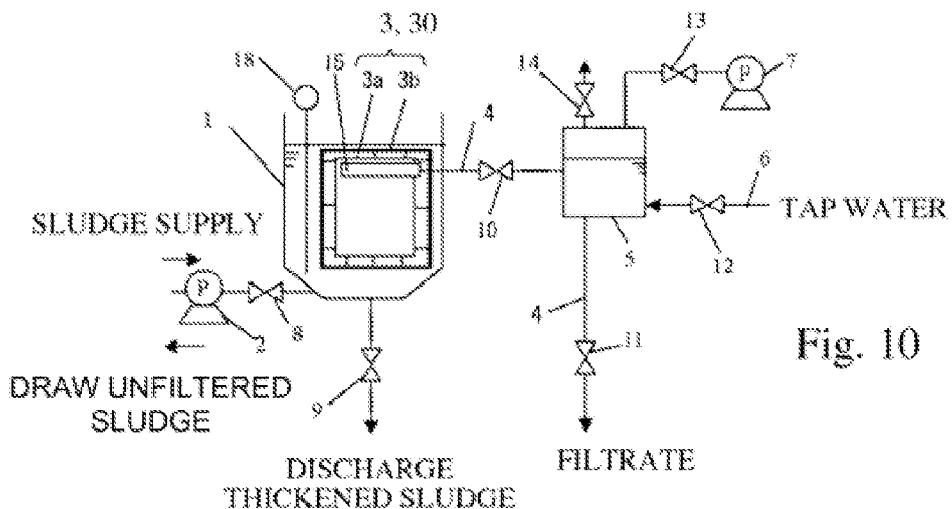
Fig. 10
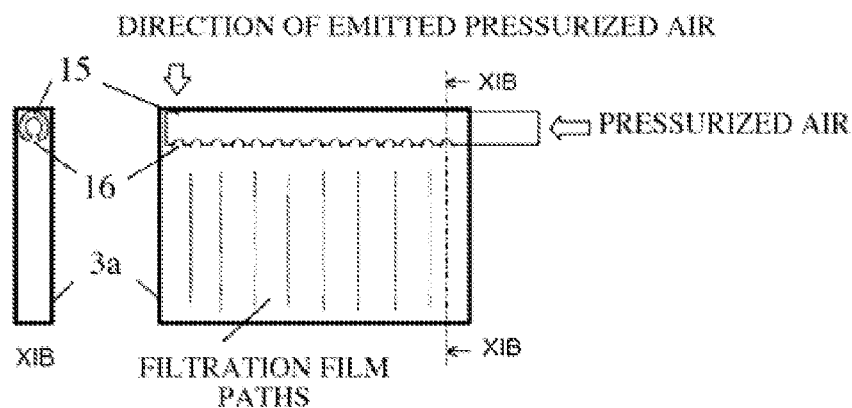
Fig. 11
(Prior Art)

SLUDGE FILTRATION APPARATUS AND FILTER ASSEMBLY THEREOF

BACKGROUND

Sludge discharged from a water treatment plant or a sewage treatment plant contains 90% or more water. Thus, as is conventionally done, the sludge is concentrated in a gravity settling tank and thereafter mechanically dehydrated to obtain thickened sludge having a water content of 80% or lower. This thickened sludge is incinerated and disposed of at landfill.

In the conventional sludge concentration apparatus using a gravity settling tank, a long retention time is required and the water content fluctuates significantly according to the sludge property. It is difficult to stably perform mechanical dehydration. For this reason, a filtration concentration apparatus has been developed as an alternative to the gravity settling tank. Referring to FIG. 10, such a conventional filtration concentration apparatus has a sludge tank 1 having a tapered bottom part, a pipe, a valve 8 and a pump 2 for supplying raw sludge to the sludge tank 1, a water level gauge 18 for detecting the level of the sludge to determine the sludge level (so that a predetermined level can be achieved by activating the pump 2 when supplying the raw sludge to the sludge tank 1), a pipe and a valve 9 for discharging the thickened sludge at the lower portion of the sludge tank 1, a plurality of sludge plates 3 disposed within the sludge tank 1, a filtrate discharge pipe 4 for discharging the filtrate obtained after filtering out the sludge using the filter plates 3 (only one illustrated), a feed tank 5 connected to the middle of the filtrate discharge pipe 4, a tap water supply pipe 6 and a valve 12 for supplying water to the feed tank 5, a pipe and a valve 14 for discharging the air accumulated within the feed tank 5, and a compressor 7 and a valve 13 connected to the feed tank 5 to supply pressurized air. The filtrate discharge pipe 4 is installed such that the outlet thereof is positioned below the bottoms of the filter plates 3. Also, the filter plates 3 each are constituted by a filtration film or membrane 3a that isolates the filtrate from the sludge, and a filter frame 3b that supports the filtration membrane 3a.

FIG. 11 illustrates the conventional configuration of the filter plate 3. An air distribution pipe 15 for drawing the filtrate or separating the thickened sludge is provided in an upper portion of the inside of the filter plate 3. The air distribution pipe 15, which is obtained by installing a round- or angular-shaped pipe made of metal or polyvinyl chloride in a horizontal direction, has a plurality of holes 16 directed in a vertically downward direction at a bottom portion thereof. Each hole 16 is provided to draw the filtrate within the filter plate 3 or to supply pressurized air that separates thickened sludge from the filtration membrane 3a. The end on the side opposite to a pressurized air blowing port of the air distribution pipe 15 is sealed.

Next, the method of operating the conventional filtration concentration apparatus is described. The valves 9 through 14 are kept closed while the valve 8 is left opened. Then, the pump 2 is activated to supply raw sludge up to a predetermined level at which the filter plate 3 installed in the sludge tank 1 is submerged.

Next, the valves 12 and 14 are opened to supply water up to a predetermined water level in the feed tank 5, and thereafter the valves 12 and 14 are closed. Then, the valves 10 and 11 are opened to begin filtration. The pump 2 is activated such that the level of the raw sludge is kept at this predetermined level during the filtration process. Supply and filtration of the sludge are continued until the thickness of the sludge deposited onto the filtration membrane 3a becomes, preferably, 10 through 13 mm. Regarding the time for continuing the filtration, the relationship between the thickness of the deposited sludge and a filtration time period can be studied beforehand, and then the filtration can be conducted with reference to the filtration time period during which the thickness of the deposited sludge becomes 10 through 13 mm. For example, in the case of this siphon filtration, filtration is performed for 90 minutes.

Next, the valve 10 is closed, while valve 8 is opened and the pump 2 is activated. The sludge that is not adhered to surfaces of the filtration membrane 3a is discharged from the sludge tank 1. After the sludge is discharged from the sludge tank 1, the valve 8 is closed. A primary side of the filtration member 3a is the side where the sludge to be treated or filtered contacts therewith, and a second side of the filtration member 3a is the side where the treated or filtered sludge contacts therewith. Next, the valves 10 and 13 are opened, and air is introduced to the secondary side of the filtration membrane 3a by means of a compressor 7 and pressurized. Accordingly, in a state in which the water within the feed tank 5 and the filtrate discharge pipe is mixed with the air from the compressor 7, the thickened sludge that is adhered to the surface of the filtration membrane 3a on the primary side is dropped from the filtration membrane 3a and is deposited onto the bottom of the sludge tank 1. Then, the valve 9 is opened to discharge the thickened sludge from the sludge tank 1.

The principle of removing the thickened sludge using the filter plate is summarized as follows.

The pressurized air supplied to the air distribution pipe 15 is emitted from the holes 16 provided on the distribution pipe toward the secondary side of the filtration membrane 3a on which the thickened sludge is adhered (some of the pressurized air being supplied to filtration membrane paths). In this manner, the thickened sludge that is adhered to the surfaces of the filtration membrane 3a around the air distribution pipe is dislodged.

The removed thickened sludge is dropped along with the rest of the thickened sludge toward the lower portion of the sludge tank 1.

The conventional filtration concentration apparatus having an air distribution pipe, however, has a problem in that the thickened sludge remains in the upper portion of the filter plate. Consequently, the amount of sludge to be processed per hour is reduced and the life of the filter plate is reduced. In other words, if the filtration cycle is repeated, further filtration and suction are performed at the section where the sludge remains, where the adhesion force between the filtration membrane and the thickened sludge increases, causing a clogging problem.

Therefore, there remains a need for a sludge filtration apparatus capable of preventing the thickened sludge from remaining in the upper portion of the filter assembly. The present disclosure addresses this problem.

SUMMARY OF THE INVENTION

The present invention relates to a sludge filtration apparatus used in a water treatment plant, a sewage treatment plant, and the like, and a filter assembly thereof.

One aspect of the present invention is a sludge filtration apparatus. The sludge filtration apparatus includes a sludge tank configured to store sludge, and at least one filter assembly. The filter assembly has a filtration membrane that filters the sludge and a pipe insertable into the filtration membrane to supply gas or air to the secondary side of the filtration membrane and dislodge the sludge from the filtration membrane. The filtration membrane has an inclined area at an upper portion thereof, and the pipe has at least one hole opposing the inclined area for emitting the gas to the inclined area.

The pipe has a plurality of opposing holes that are directed generally upwardly toward the inclined area so that the supplied gas is discharged generally upwardly through the holes. A gap can be provided between the hole and the filtration membrane. The filtration membrane can be flexible. A porous member can be provided between the pipe and the filtration membrane. An angle formed by the inclination of the inclined area with respect to a vertical line can be 45 degrees or less.

Another aspect of the present invention is the filter assembly described above.

BRIEF DESCRIPTION OF THE DRAWINGS

FIGS. 9A and 9B are similar to FIG. 2, but schematically illustrates another embodiment of the filter assembly according to the present invention.

FIG. 10 schematically illustrates a conventional sludge filtration apparatus that can incorporate any of the above embodiments of the filter assembly according to the present invention.

FIG. 11 schematically illustrates a conventional filter assembly.

DETAILED DESCRIPTION

A sludge filtration apparatus according to the present invention can have the same configuration as that illustrated FIG. 10, except for the filter assembly 30.

Figure 1:
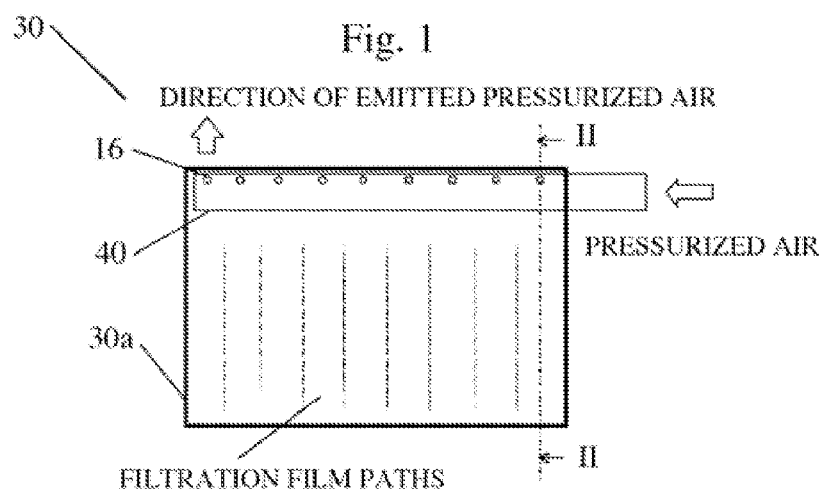
FIG. 1 schematically illustrates a filter assembly according to the present invention.

Referring to FIG. 1, the filter assembly 30 has a filtration film or membrane 30a and an air distribution pipe 40. The filter assembly 30 can include a filter frame (not illustrated) if desired. The filtration membrane 30a is in the form of a pouch that can be made by stitching the periphery thereof (such as with machine-sewing threads). Furthermore, a filtration membrane path that is stitched with machine-sewing threads is formed in a central part of the filtration membrane. The inside of the pouch made by stitching the filtration membrane 30a is configured so that the air distribution pipe 40 can be inserted into the secondary side of the filtration membrane. Pressurized gas or air can flow through the pipe 40 to draw the moisture from or to dislodge the thickened sludge adhered to the surface of the filtration membrane.

Figure 2:
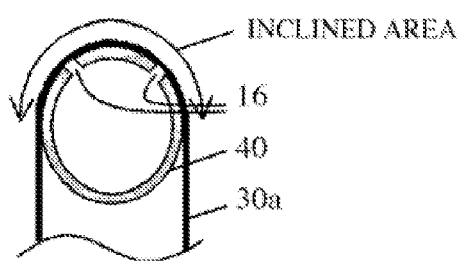
FIG. 2 schematically illustrates a cross-sectional view of the filter assembly taken along line II-II of FIG. 1.

FIG. 2 shows a cross-sectional view taken along line II-II of the air distribution pipe 40 of FIG. 1. The air distribution pipe 40 has at least one hole 16 (illustrated with a plurality of holes), for emitting gas, e.g., air, to an inclined (which can be straight or curved) area of an upper portion of the filtration membrane 30a. The end on the side opposite to a pressurized air blowing port of the air distribution pipe 40 is sealed so that air exits through the holes 16. The sludge filtration apparatus according to the present invention can operate in the same manner as described above in reference with FIG. 10.

Specifically, the valves 9 through 14 are kept closed while the valve 8 is left opened. Then, the pump 2 is activated to supply raw sludge up to a predetermined level at which the filter assembly 30 installed in the sludge tank 1 is submerged. Next, the valves 12 and 14 are opened to supply water up to a predetermined water level in the feed tank 5, and thereafter the valves 12 and 14 are closed. Then, the valves 10 and 11 are opened to begin filtration. The pump 2 is activated such that the level of raw sludge is kept at this predetermined level during the filtration process. Supply and filtration of the sludge are continued until the thickness of the sludge deposited onto the filtration membrane 30a becomes, preferably, 10 through 13 mm. Regarding the time for continuing the filtration, the relationship between the thickness of the deposited sludge and the filtration period can be studied beforehand, and then the filtration can be conducted with reference to the filtration period during which the thickness of the deposited sludge becomes 10 through 13 mm. For example, in the case of this siphon filtration, filtration is performed for 90 minutes.

Next, the valve 10 is closed, while the valve 8 is opened and the pump 2 is activated. The untreated sludge that is not adhered to surfaces of the filtration membrane 30a is discharged from the sludge tank 1. After the untreated sludge is discharged from the sludge tank 1, the valve 8 is closed. Then, with the valves 11 and 14 opened, the water in the feed tank 5 and the filtrate discharge pipe 4 is removed, and thereafter the valves 11 and 14 are closed.

Next, the valves 10 and 13 are opened, and air is introduced to the secondary side of the filtration membrane 30a via the pipe 40, 40A, 40B, 40C, 40D by means of a compressor 7 and pressurized. Accordingly, the thickened sludge that is adhered to a surface of the primary side of the filtration membrane 30a is dislodged from the filtration membrane 30a, and deposited onto the bottom of the sludge tank 1. Then, the valve 9 is opened to discharge the thickened sludge from the sludge tank 1.

Table 1 shows the results obtained using the embodiments of the conventional technology and the present invention. The sludge used in these embodiments is obtained by filtering dam effluent, which is a water source, in an amount of 20000 m³ per day. Also, filtration was carried out for 90 minutes at a filtration pressure of 33 kPa. The thickened sludge was removed by continuously applying a pressure of 5 kg/cm² for five seconds. Regarding the filtration membrane, membranes each having nylon monofilament and a filtration area of 1.3 m² per sheet were used. According to the results shown in Table 1, thickened-sludge removal rate of the conventional technology was 60 through 90%, while that of the embodiments of the present invention increased to 95 through 98% under the condition that the same thickened-sludge thickness and thickened-sludge concentration were used, due to the holes 16 that are provided on the air distribution pipe 40 to emit air to the inclined area of the upper portion of the filtration membrane 30a.

TABLE 1

|  | Conventional technology | Embodiments of the present invention |
| --- | --- | --- |
| Thickness of thickened sludge | 9 mm | 9 mm |
| Concentration of thickened sludge | 8.0 through 8.5% | 8.0 through 8.5% |
| Thickened-sludge removal rate | 60 through 90% | 95 through 98% |

Moreover, even when the air distribution pipes 40A, 40B, 40C, 40D shown in FIGS. 3 through 9 are used, the thickened sludge remaining in the upper portion of the filter plate 30 can be eliminated.

Figure 3:
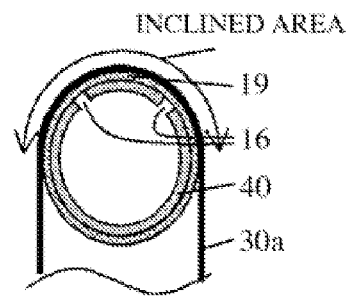
FIG. 3 is similar to FIG. 2, but schematically illustrates another embodiment of the filter assembly.

FIG. 3 shows another embodiment of the filter assembly 30, which is similar to FIG. 2, except that a porous member 19 is placed between the air distribution pipe 40 and the filtration membrane 30a. The porous member 19 can be a mesh-like member.

Figure 4:
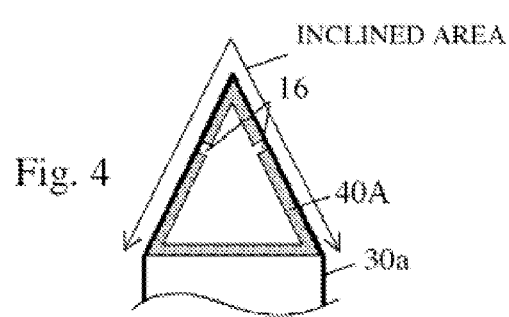
FIG. 4 is similar to FIG. 2, but schematically illustrates another embodiment of the filter assembly.

FIG. 4 shows an embodiment in which an angle formed by an inclined surface of the filtration membrane with respect to a vertical line is 45 degrees or less. Since the thickened sludge in the upper portion of the filter assembly 30 is removed along with the thickened sludge that is still adhered to the filtration membrane, the thickened sludge can be easily removed from the filtration membrane. Also, when the vertical cross-sectional shape of the air distribution pipe 40A is a triangular, as shown in FIG. 4, if the base of the triangle is wide, the thickness of the filter assembly 30 increases and the filtrate remaining in the filter membrane 30a increases, thus reducing the concentration of the thickened sludge obtained after removal. Therefore, it is desirable for the air distribution pipe 40 to have a narrow triangle base.

Figure 5:
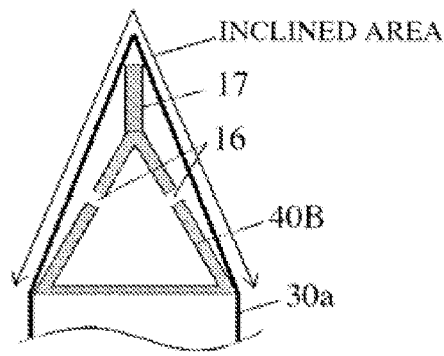
FIG. 5 is similar to FIG. 2, but schematically illustrates another embodiment of the filter assembly.
Figure 6:
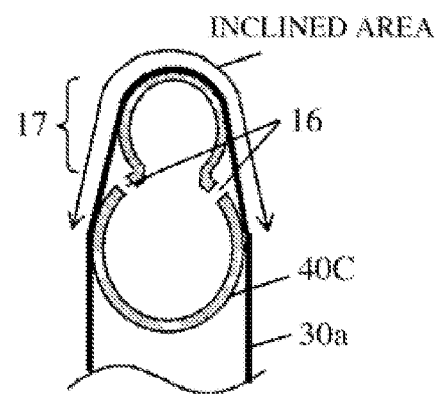
FIG. 6 is similar to FIG. 2, but schematically illustrates another embodiment of the filter assembly.
Figure 7:
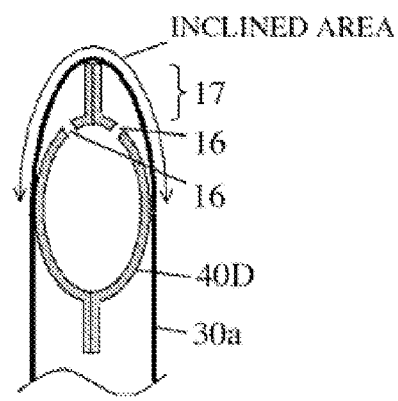
FIG. 7 is similar to FIG. 2, but schematically illustrates another embodiment of the filter assembly.
Figure 8:
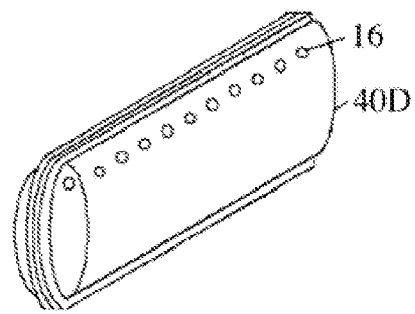
FIG. 8 illustrates a perspective view of the air distribution pipe of FIG. 7.

FIGS. 5 through 8 each show an embodiment of the filter assembly 30 in which a gap is provided between the holes 16 and the filtration membrane 30a. Specifically, a protruding member 17 is provided at the top portion of the air distribution pipe 40B, 40C, 40D, and the gap is provided between the filtration membrane 30a and the holes 16. Specifically, FIG. 5 shows an embodiment in which the protruding member 17 is provided at the top portion of the air distribution pipe 40B, which is similar to the embodiment of FIG. 4. FIG. 6 shows an embodiment in which the top portion of the air distribution pipe 40 shown in FIG. 2 is narrowed down and the protruding member 17 is provided at the top of the air distribution pipe 40A, resulting in the configuration of the air distribution pipe 40C. The air distribution pipe 40D shown in FIGS. 7 and 8 is obtained by forming the holes 16 on each of stainless plates, pressing and bending the stainless plates, joining these two stainless plates together, and welding the surrounding parts except the pressurized air blowing port, such as by electrical resistance welding.

FIGS. 9A and 9B show an embodiment in which the filtration membrane 30a is formed such that it is partially separated from the air distribution pipe 40, and the holes 16 are positioned opposing the upper area of the filtration membrane after the filtration. The upper area of the filtration membrane becomes an inclined area after the filtration is completed. Specifically, the inclined area is the area in which the filtration membrane inclines down with the secondary side thereof. In the example shown in FIGS. 9A and 9B, the filtration membrane 30a is flexible so that the shape thereof changes before and after the filtration.

It should be noted that when the top portion of the filtration membrane is flat, the inclined area includes the flat part of the top portion. Pressurized air that is added to the inside of the pipe can apply pressure to the filtration membrane upward from the bottom to prevent the thickened sludge from remaining in the inclined area.

By providing the gap, a vibration applied to the filtration membrane by the pressurized air can be transmitted across a wide area. By providing a porous member between the pipe and the filtration membrane, the flow of filtrate and pressurized air can be facilitated. By having the angle formed by the inclination of the inclined area with respect to a vertical line at 45 degrees or less, the thickened sludge in the upper portion can be removed along with the sludge that is still adhered to the filtration membrane, allowing the thickened sludge to be removed easily from the filtration membrane.

According to the present apparatus, the thickened sludge adhered to the entire filtration membrane can be dislodged and removed, increasing the amount of sludge processed. Furthermore, the thickened sludge remaining in the upper portion of the filter plate can be eliminated, preventing clogging of the filtration membrane while increasing the length of the replacement cycle of the filtration membrane.

While the present invention has been particularly shown and described with reference to preferred embodiment thereof, it will be understood by those skilled in the art that the foregoing and other changes in form and details can be made therein without departing from the spirit and scope of the present invention. All modifications and equivalents attainable by one versed in the art from the present disclosure within the scope and spirit of the present invention are to be included as further embodiments of the present invention. The scope of the present invention accordingly is to be defined as set forth in the appended claims.

This application is based on JP PA 2006-116584 filed on 20 Apr. 2006. The disclosure of the above application, in its entirety, including the drawings, claims, and the specification thereof, is incorporated herein by reference.

What is claimed is:

1. A sludge filtration apparatus comprising:
   an air compressor;
   a sludge tank configured to store sludge; and
   at least one filter assembly,
   wherein the filter assembly includes a filtration membrane that filters the sludge and a pipe having a plurality of holes, all of the holes provided on the pipe being positioned to confront the filtration membrane to supply air to a secondary side of the filtration membrane and dislodge the sludge from the filtration membrane,
   wherein the air compressor introduces air to the pipe,
   wherein the filtration membrane has an inclined area at an upper portion thereof, and
   wherein all of the holes are situated at the inclined area so that all of the holes on the pipe are directed upwardly to allow air to be discharged generally upwardly above the inclined area and emit air upwardly.

2. The sludge filtration apparatus according to claim 1, wherein the filter assembly includes a gap that is maintained between the holes and the filtration membrane.

3. The sludge filtration apparatus according to claim 1, wherein the filtration membrane is flexible.

4. The sludge filtration apparatus according to claim 2, wherein the filtration membrane is flexible.

5. The sludge filtration apparatus according to claim 1, wherein the filter assembly includes a porous member between the pipe and the filtration membrane.

6. The sludge filtration apparatus according to claim 2, wherein the filter assembly includes a porous member between the pipe and the filtration membrane.

7. The sludge filtration apparatus according to claim 1, wherein:
   the pipe is angular and has an inclined surface over which the filtration membrane is disposed, the inclined surface having an angle of 45 degrees or less with respect to a vertical line intersecting the inclined surface, and
   the holes are located in the inclined surface.

8. The sludge filtration apparatus according to claim 2, wherein:
   the pipe is angular and has an inclined surfaces over which the filtration membrane is disposed, the inclined surface having an angle of 45 degrees or less with respect to a vertical line intersecting the inclined surface, and the holes are located in the inclined surface.

9. A filter assembly for a sludge filtration apparatus, the filter assembly comprising:

an air compressor;

a filtration membrane that filters sludge; and a pipe having a plurality of holes, all of the holes provided on the pipe are positioned to confront the filtration membrane to supply air to a secondary side of the filtration membrane and dislodge the sludge from the filtration membrane, wherein the air compressor introduces air into the pipe, wherein the filtration membrane has an inclined area at an upper portion thereof, and wherein all of the holes are situated at the inclined area so that all of the holes provided on the pipe are directed upwardly to allow air to be discharged upwardly above the inclined area and emit air upwardly.

10. The filter assembly according to claim 9, further including a gap that is maintained between the at least one hole and the filtration membrane.

11. The filter assembly according to claim 9, wherein the filtration membrane is flexible.

12. The filter assembly according to claim 9, further including a porous member between the pipe and the filtration membrane.

13. The filter assembly according to claim 9, wherein:

the pipe is angular and has an inclined surfaces over which the filtration membrane is disposed, the inclined surface having an angle of 45 degrees or less with respect to a vertical line intersecting the inclined surface, and the holes are located in the inclined surface.

* * * * *